United States Patent
King et al.

(10) Patent No.: US 6,674,818 B1
(45) Date of Patent: Jan. 6, 2004

(54) REDUCED COMPLEXITY DECISION CIRCUITRY

(75) Inventors: Eric J. King, Greensboro, NC (US); Peijun Shan, Jamestown, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 0 days.

(21) Appl. No.: 09/550,567

(22) Filed: Apr. 17, 2000

(51) Int. Cl.[7] .............................. H03D 1/00; H04L 27/06
(52) U.S. Cl. ......................................... 375/343; 708/422
(58) Field of Search ................................. 375/130, 142, 375/150, 343; 708/422

(56) References Cited

U.S. PATENT DOCUMENTS

| | | | |
|---|---|---|---|
| 4,454,604 A | 6/1984 | Myers ........................... 375/1 |
| 4,476,458 A | 10/1984 | Dollard ............... 340/347 DD |
| 4,941,154 A | 7/1990 | Wei .............................. 375/39 |
| 5,077,753 A | 12/1991 | Grau, Jr. et al. ................. 375/1 |
| 5,216,693 A | 6/1993 | Nakamura ...................... 375/1 |
| 5,301,206 A | 4/1994 | Ishigaki et al. ................. 375/1 |
| 5,357,454 A | 10/1994 | Dent ........................... 364/727 |
| 5,412,687 A | 5/1995 | Sutton et al. ................ 375/202 |
| 5,463,657 A | 10/1995 | Rice ............................ 375/200 |
| 5,528,624 A | 6/1996 | Kaku et al. .................. 375/206 |
| 5,566,214 A | 10/1996 | Kroeger et al. .............. 375/355 |
| 5,579,338 A | 11/1996 | Kojima ........................ 375/208 |
| 5,581,585 A | 12/1996 | Takatori et al. .............. 375/376 |
| 5,604,772 A | 2/1997 | Botto et al. .................. 375/341 |
| 5,608,722 A | 3/1997 | Miller ......................... 370/320 |
| 5,640,416 A | 6/1997 | Chalmers ..................... 375/206 |
| 5,651,032 A | 7/1997 | Okita .......................... 375/341 |
| 5,656,976 A | 8/1997 | Jung et al. ..................... 331/18 |
| 5,717,706 A | 2/1998 | Ikeda ........................... 371/43 |
| 5,764,687 A | 6/1998 | Easton ........................ 375/206 |
| 5,809,060 A | 9/1998 | Cafarella et al. ............ 375/206 |
| 5,914,949 A | 6/1999 | Li ............................... 370/342 |
| 6,029,116 A | 2/2000 | Wright et al. ................. 702/32 |
| 6,075,807 A * | 6/2000 | Warren et al. ............... 375/143 |
| 6,075,812 A | 6/2000 | Cafarella et al. ............ 375/206 |
| 6,108,324 A | 8/2000 | Brown et al. ................ 370/335 |
| 6,115,431 A | 9/2000 | Lee ............................. 375/324 |
| 6,324,235 B1 | 11/2001 | Savell et al. ................. 375/372 |
| 6,430,212 B1 * | 8/2002 | Alisobhani et al. .......... 375/141 |
| 6,456,646 B1 * | 9/2002 | Asokan et al. ............... 375/142 |
| 6,526,091 B1 * | 2/2003 | Nystrom et al. ............. 375/142 |
| 2002/0122466 A1 | 9/2002 | Somayazulu ................ 375/142 |
| 2002/0124036 A1 | 9/2002 | Rawlins et al. .............. 708/422 |
| 2003/0103004 A1 | 6/2003 | Arndt et al. ................. 342/465 |

* cited by examiner

Primary Examiner—Jean B. Corrielus
(74) Attorney, Agent, or Firm—Withrow & Terranova, PLLC (57) ABSTRACT

The present invention groups a set of N, nearly orthogonal, CCK code words into M subgroups, with each subgroup consisting of N/M orthogonal code words. For the 64-ary CCK communication standard for wireless local area networks (WLAN), N is 64 and M is preferably 8. Based on the orthogonal subgrouping, most significant bit (MSB) comparitors, instead of full-scale comparitors, are used to compare cross-correlations for each subgroup. In the subgroup containing the desired maximum correlation, all other cross-correlations, except the maximum, are zero in an ideal case, or very close to zero in a noisy environment due to the selected orthogonality. The maximum correlation value can be distinguished by looking at only the most significant bit or bits among all the cross-correlations. In the subgroups that do not contain the global, maximum correlation value, it does not matter which cross-correlation value is picked. The maximum correlation from all the subgroups, which will include the global maximum from one of the subgroups, are monitored to select the maximum correlation value and the corresponding code word.

29 Claims, 10 Drawing Sheets

| Code Index | | Length-8 Code Words | | | | | | | |
|---|---|---|---|---|---|---|---|---|---|
| 0 | 000000 | +1 | +1 | +1 | -1 | +1 | +1 | -1 | +1 |
| 1 | 000001 | +j | +j | +j | -j | +1 | +1 | -1 | +1 |
| 2 | 000010 | -1 | -1 | -1 | +1 | +1 | +1 | -1 | +1 |
| 3 | 000011 | -j | -j | -j | +j | +1 | +1 | -1 | +1 |
| 4 | 000100 | +j | +j | +1 | -1 | +j | +j | -1 | +1 |
| 5 | 000101 | -1 | -1 | +j | -j | +j | +j | -1 | +1 |
| 6 | 000110 | -j | -j | -1 | +1 | +j | +j | -1 | +1 |
| 7 | 000111 | +1 | +1 | -j | +j | +j | +j | -1 | +1 |
| 8 | 001000 | -1 | -1 | +1 | -1 | -1 | -1 | -1 | +1 |
| 9 | 001001 | -j | -j | +j | -j | -1 | -1 | -1 | +1 |
| 10 | 001010 | +1 | +1 | -1 | +1 | -1 | -1 | -1 | +1 |
| 11 | 001011 | +j | +j | -j | +j | -1 | -1 | -1 | +1 |
| 12 | 001100 | -j | -j | +1 | -1 | -j | -j | -1 | +1 |
| 13 | 001101 | +1 | +1 | +j | -j | -j | -j | -1 | +1 |
| 14 | 001110 | +j | +j | -1 | +1 | -j | -j | -1 | +1 |
| 15 | 001111 | -1 | -1 | -j | +j | -j | -j | -1 | +1 |
| 16 | 010000 | +j | +1 | +j | -1 | +j | +1 | -j | +1 |
| 17 | 010001 | -1 | +j | -1 | -j | +j | +1 | -j | +1 |
| 18 | 010010 | -j | -1 | -j | +1 | +j | +1 | -j | +1 |
| 19 | 010011 | +1 | -j | +1 | +j | +j | +1 | -j | +1 |
| 20 | 010100 | -1 | +j | +j | -1 | -1 | +j | -j | +1 |
| 21 | 010101 | -j | -1 | -1 | -j | -1 | +j | -j | +1 |
| 22 | 010110 | +1 | -j | -j | +1 | -1 | +j | -j | +1 |
| 23 | 010111 | +j | +1 | +1 | +j | -1 | +j | -j | +1 |
| 24 | 011000 | -j | -1 | +j | -1 | -j | -1 | -j | +1 |
| 25 | 011001 | +1 | -j | -1 | -j | -j | -1 | -j | +1 |
| 26 | 011010 | +j | +1 | -j | +1 | -j | -1 | -j | +1 |
| 27 | 011011 | -1 | +j | +1 | +j | -j | -1 | -j | +1 |
| 28 | 011100 | +1 | -j | +j | -1 | +1 | -j | -j | +1 |
| 29 | 011101 | +j | +1 | -1 | -j | +1 | -j | -j | +1 |
| 30 | 011110 | -1 | +j | -j | +1 | +1 | -j | -j | +1 |
| 31 | 011111 | -j | -1 | +1 | +j | +1 | -j | -j | +1 |

*FIG. 1A*

| Code Index | | Length-8 Code Words | | | | | | | |
|---|---|---|---|---|---|---|---|---|---|
| 32 | 100000 | -1 | +1 | -1 | -1 | -1 | +1 | +1 | +1 |
| 33 | 100001 | -j | +j | -j | -j | -1 | +1 | +1 | +1 |
| 34 | 100010 | +1 | -1 | +1 | +1 | -1 | +1 | +1 | +1 |
| 35 | 100011 | +j | -j | +j | +j | -1 | +1 | +1 | +1 |
| 36 | 100100 | -j | +j | -1 | -1 | -j | +j | +1 | +1 |
| 37 | 100101 | +1 | -1 | -j | -j | -j | +j | +1 | +1 |
| 38 | 100110 | +j | -j | +1 | +1 | -j | +j | +1 | +1 |
| 39 | 100111 | -1 | +1 | +j | +j | -j | +j | +1 | +1 |
| 40 | 101000 | +1 | -1 | -1 | -1 | +1 | -1 | +1 | +1 |
| 41 | 101001 | +j | -j | -j | -j | +1 | -1 | +1 | +1 |
| 42 | 101010 | -1 | +1 | +1 | +1 | +1 | -1 | +1 | +1 |
| 43 | 101011 | -j | +j | +j | +j | +1 | -1 | +1 | +1 |
| 44 | 101100 | +j | -j | -1 | -1 | +j | -j | +1 | +1 |
| 45 | 101101 | -1 | +1 | -j | -j | +j | -j | +1 | +1 |
| 46 | 101110 | -j | +j | +1 | +1 | +j | -j | +1 | +1 |
| 47 | 101111 | +1 | -1 | +j | +j | +j | -j | +1 | +1 |
| 48 | 110000 | -j | +1 | -j | -1 | -j | +1 | +j | +1 |
| 49 | 110001 | +1 | +j | +1 | -j | -1 | +1 | +J | +1 |
| 50 | 110010 | +j | -1 | +j | +1 | -j | +1 | +j | +1 |
| 51 | 110011 | -1 | -j | -1 | +j | -j | +1 | +j | +1 |
| 52 | 110100 | +1 | +j | -j | -1 | +1 | +j | +j | +1 |
| 53 | 110101 | +j | -1 | +1 | -j | +1 | +j | +j | +1 |
| 54 | 110110 | -1 | -j | +j | +1 | +1 | +j | +j | +1 |
| 55 | 110111 | -j | +1 | -1 | +j | +1 | +j | +j | +1 |
| 56 | 111000 | +j | -1 | -j | -1 | +j | -1 | +j | +1 |
| 57 | 111001 | -1 | -j | +1 | -j | +j | -1 | +j | +1 |
| 58 | 111010 | -j | +1 | +j | +1 | +j | -1 | +j | +1 |
| 59 | 111011 | +1 | +j | -1 | +j | +j | -1 | +j | +1 |
| 60 | 111100 | -1 | -j | -j | -1 | -1 | -j | +j | +1 |
| 61 | 111101 | -j | +1 | +1 | -j | -1 | -j | +j | +1 |
| 62 | 111110 | +1 | +j | +j | +1 | -1 | -j | +j | +1 |
| 63 | 111111 | +j | -1 | -1 | +j | -1 | -j | +j | +1 |

*FIG 1B*

8-BY-8 GROUPING FOR THE CCK CODE SET

|  | MEMBER OF EACH SUBGROUP (CODE INDEX) | | | | | | | |
|---|---|---|---|---|---|---|---|---|
| SUBGROUP 1 | 0 | 2 | 32 | 34 | 8 | 10 | 40 | 42 |
| SUBGROUP 2 | 1 | 3 | 33 | 35 | 9 | 11 | 41 | 43 |
| SUBGROUP 3 | 4 | 6 | 36 | 38 | 12 | 14 | 44 | 46 |
| SUBGROUP 4 | 5 | 7 | 37 | 39 | 13 | 15 | 45 | 47 |
| SUBGROUP 5 | 16 | 18 | 48 | 50 | 24 | 26 | 56 | 58 |
| SUBGROUP 6 | 17 | 19 | 49 | 51 | 25 | 27 | 57 | 59 |
| SUBGROUP 7 | 20 | 22 | 52 | 54 | 28 | 30 | 60 | 62 |
| SUBGROUP 8 | 21 | 23 | 53 | 55 | 29 | 31 | 61 | 63 |

REDUCED COMPLEXITY DECISION CIRCUITRY

BACKGROUND OF THE INVENTION

The present invention relates to spread spectrum communications, and in particular, to a spread spectrum receiver incorporating complementary code keying (CCK). IEEE 802.11(b) provides a standard for wireless local area network communications using complementary code keying. Receivers capable of demodulating CCK modulated signals require extensive circuitry to correlate received data with the numerous possible code words. Traditionally, each received word is correlated with all possible code words for proper correlation. For a 64-word code set, at least 63 full-scale comparitors are necessary for correlation. This vast number of comparitors results in a major hardware cost. There is a need to efficiently correlate received data with the code words in a CCK code set without requiring the extensive amount of components, semiconductor area, and power associated with correlation architectures requiring full-scale comparitors for each code word.

SUMMARY OF THE INVENTION

The present invention groups a set of N, nearly orthogonal, CCK code words into M subgroups, with each subgroup consisting of N/M orthogonal code words. For the 64-ary CCK communication standard for wireless local area networks (WLAN), N is 64 and M is preferably 8. Based on the orthogonal subgrouping, most significant bit (MSB) comparators, instead of full-scale comparators, are used to compare cross-correlations for each subgroup. In the subgroup containing the desired maximum correlation value, all other cross-correlation values, except the maximum, are zero in an ideal case, or very close to zero in a noisy environment due to the selected orthogonality. The maximum correlation value within the subgroup can be distinguished by looking at only the most significant bit or bits among all the cross-correlations. The maximum correlation values from all the subgroups, which will include the global maximum from one of the subgroups, are monitored to select the maximum correlation value and the corresponding code word. In the subgroups that do not contain the global, maximum correlation value, it does not matter which cross-correlation value is picked. The invention yields substantial savings on hardware costs by reducing the amount of components and silicon required to implement correlation circuitry, and also reduces power consumption.

DETAILED DESCRIPTION OF THE PREFERRED EMBODIMENT

Figure 1A:
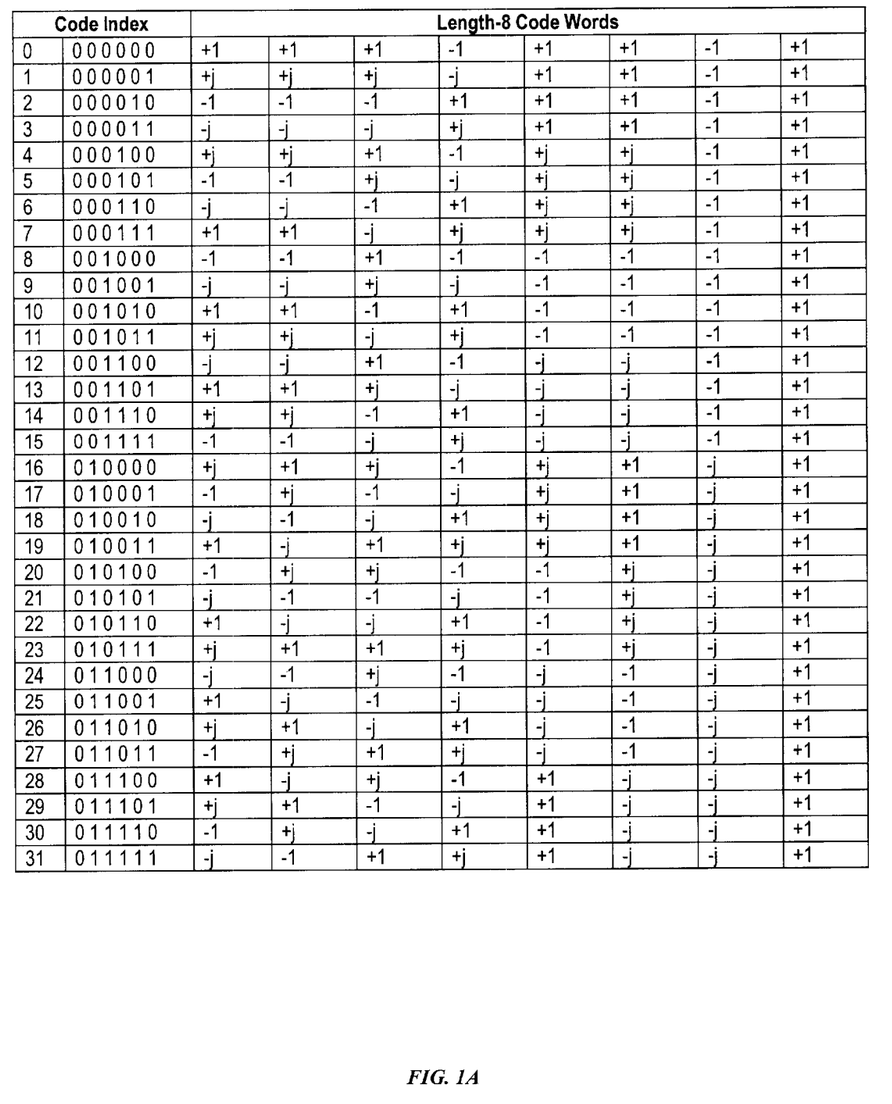
FIGS. 1A and 1B define a 64-length complementary code keying code set.
Figure 1B:
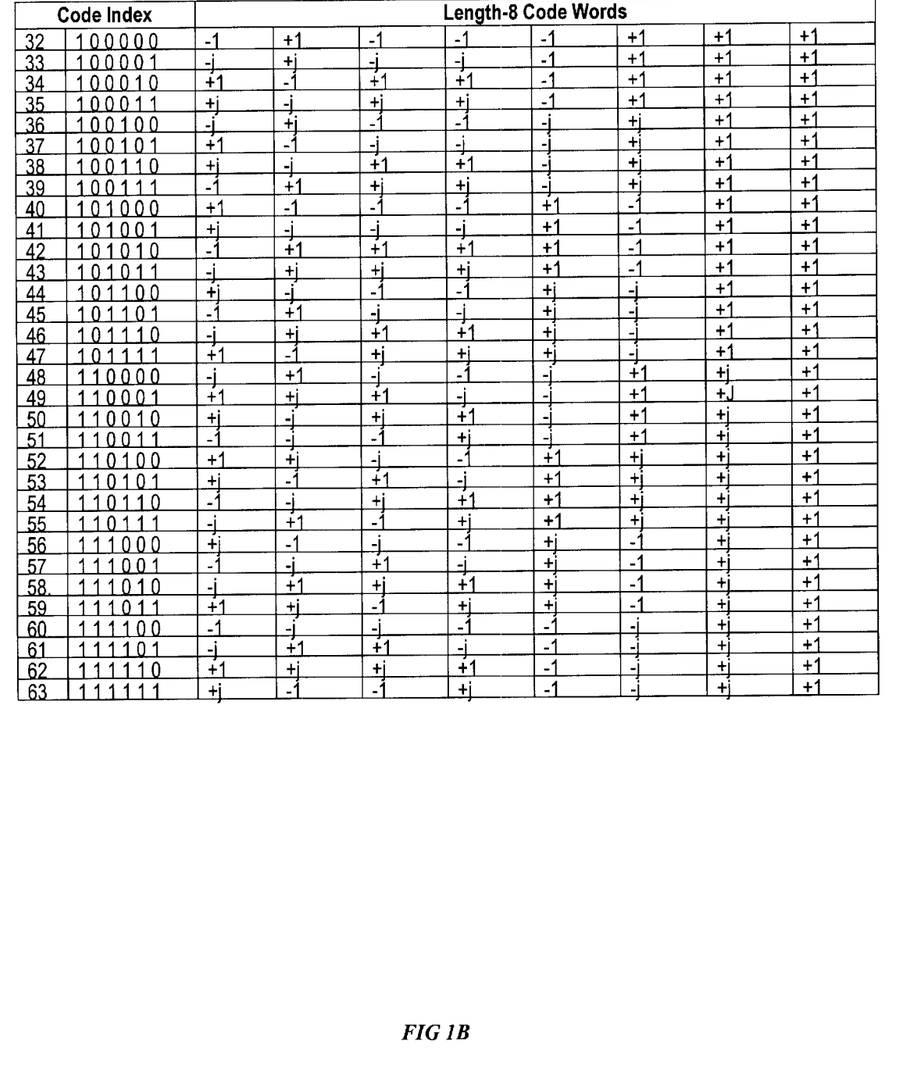
Figure 2:
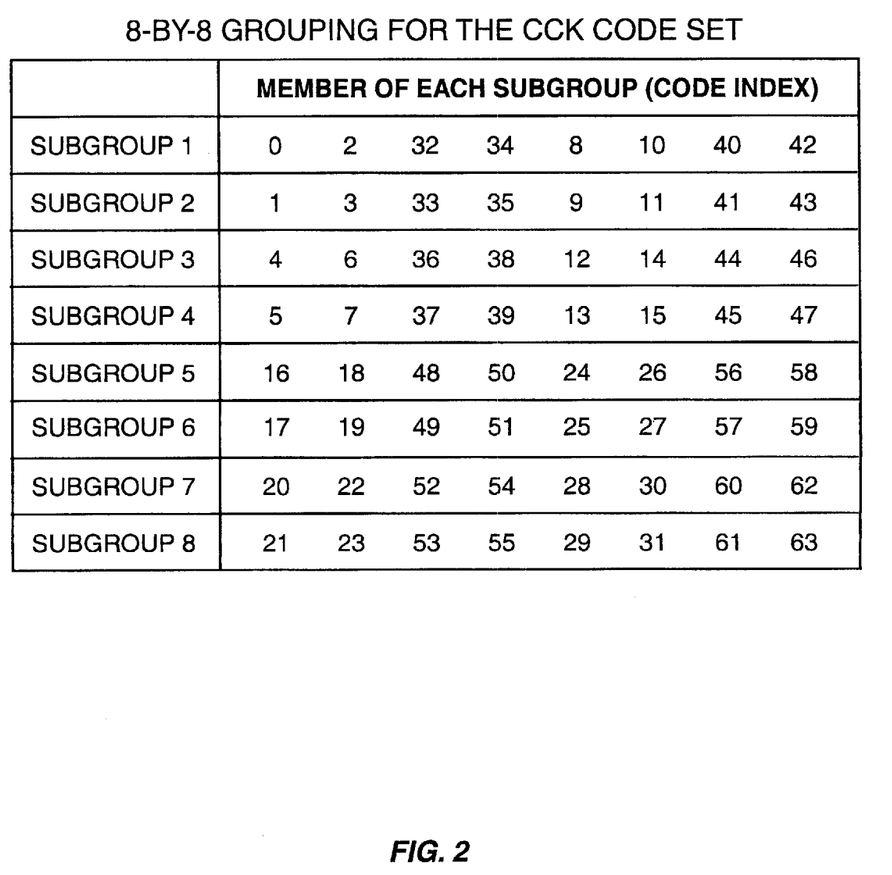
FIG. 2 is a table defining 8 orthogonal subgroups for the complementary code keying code set of FIGS. 1A and 1B.

Complementary code keying (CCK) is used in spread spectrum communications according to the standard set forth in IEEE 802.11(b) for wireless Local Area Networks (WLAN). A standard 64-word CCK code set is shown in FIGS. 1A and 1B. The code index is data to be transmitted, and is shown in decimal and binary form. The "length-8 code words" represent symbols corresponding to the data to be transmitted. Those skilled in the art will recognize that other CCK code sets are possible; however, the 64-word CCK code set is used for the purpose of disclosing the present invention. Further, as shown in FIG. 2, the 64-word code set may be divided into subgroups wherein the code words within any one subgroup are orthogonal to one another. FIG. 2 outlines eight subgroups according to the preferred embodiment.

Figure 3:
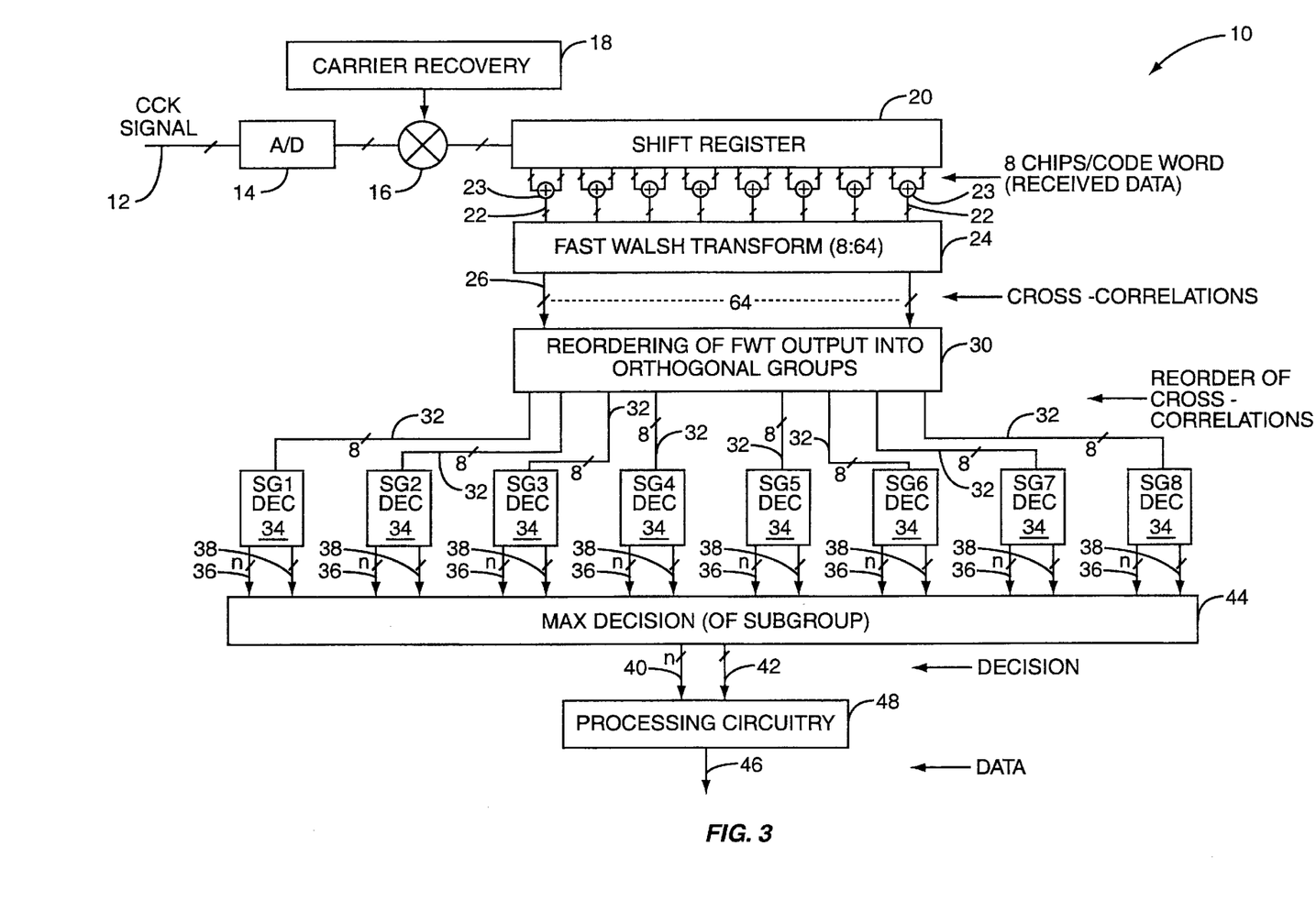
FIG. 3 is a block representation of a complementary code keying receiver.

Turning now to FIG. 3, a block representation of a CCK receiver 10 is depicted. Generally, a received CCK signal 12 is sampled and digitized using an analog-to-digital converter 14 and down-converted using mixing circuitry 16 and carrier recovery circuitry 18, which controls the mixing circuitry 16. The resulting recovered data is continuously fed into decimation circuitry (not shown) to effectively reduce the sampling rate of the complex CCK signal to two times the chip rate of eight chips per symbol. The decimation circuitry typically incorporates a register, such as a flip-flop, and summation circuitry to effectively sum the samples corresponding to a particular chip. Preferably, the decimation circuitry is clocked at a sample rate to provide a decimated CCK signal that is serially shifted into a 16-stage shift register 20. Notably, the CCK signal is complex and remains complex substantially throughout processing. Signal lines including a diagonal hash mark indicate complex signals. Further, all signals downstream from the analog-to-digital converter 14 are complex. Preferably, these complex signals are represented by real and imaginary digital coordinates, I+jQ, in traditional quadrature form.

With the 64-word CCK code set, preferably the shift register 20 can output 16 complex values corresponding to the received data 22. Pairs of these values are summed using summing circuitry 23 to provide eight complex values 22. Each complex value 22 corresponds to one of eight chips, which are sent to circuitry 24 capable of performing a Fast Walsh Transform on the eight complex values to provide 64 complex, cross-correlations. These cross-correlations represent the correlation properties of any given received data with each of the 64 code words in the CCK code set. Given the substantially orthogonal nature of the CCK code set, the received data corresponding to one of the 64 code words will have a correlation property significantly larger than the remaining cross-correlations 26.

The present invention provides a significant improvement over the prior art in the ability to rapidly and efficiently determine which of the 64 cross-correlations has the highest correlation property. Reordering circuitry 30 is provided to divide and group the 64 cross-correlations into predefined subgroups wherein the corresponding code words within any one group are orthogonal. The reordering is done according to that defined in FIG. 2. As such, the cross-correlations are regrouped into eight groups of eight cross-correlations. Each of these eight complex correlations 32 is sent to corresponding subgroup, maximum decision circuitry 34 (SG 1–SG 8). For each subgroup, maximum decision circuitry 34, a maximum correlation value 36 and a maximum correlation index 38 is provided. The maximum correlation property value 36 corresponds to the maximum value of any of the cross-correlations within the given subgroup. The maximum correlation index 38 provides a reference to the particular cross-correlation, or code word, associated with the maximum correlation property value. The output of each of the maximum decision circuitries 34 identifies the cross-correlation having the greatest correlation value and the correlation value itself.

The resulting eight maximum correlation property values 36 and corresponding maximum correlation indices 38 from the eight maximum decision circuitries 34 are provided to an overall maximum decision circuitry 44, which selects the overall maximum correlation value 40 and a corresponding overall maximum correlation index 42. From the overall maximum correlation value and index 40, 42, the transmitted data 46 is determined using processing circuitry 48.

Figure 4:
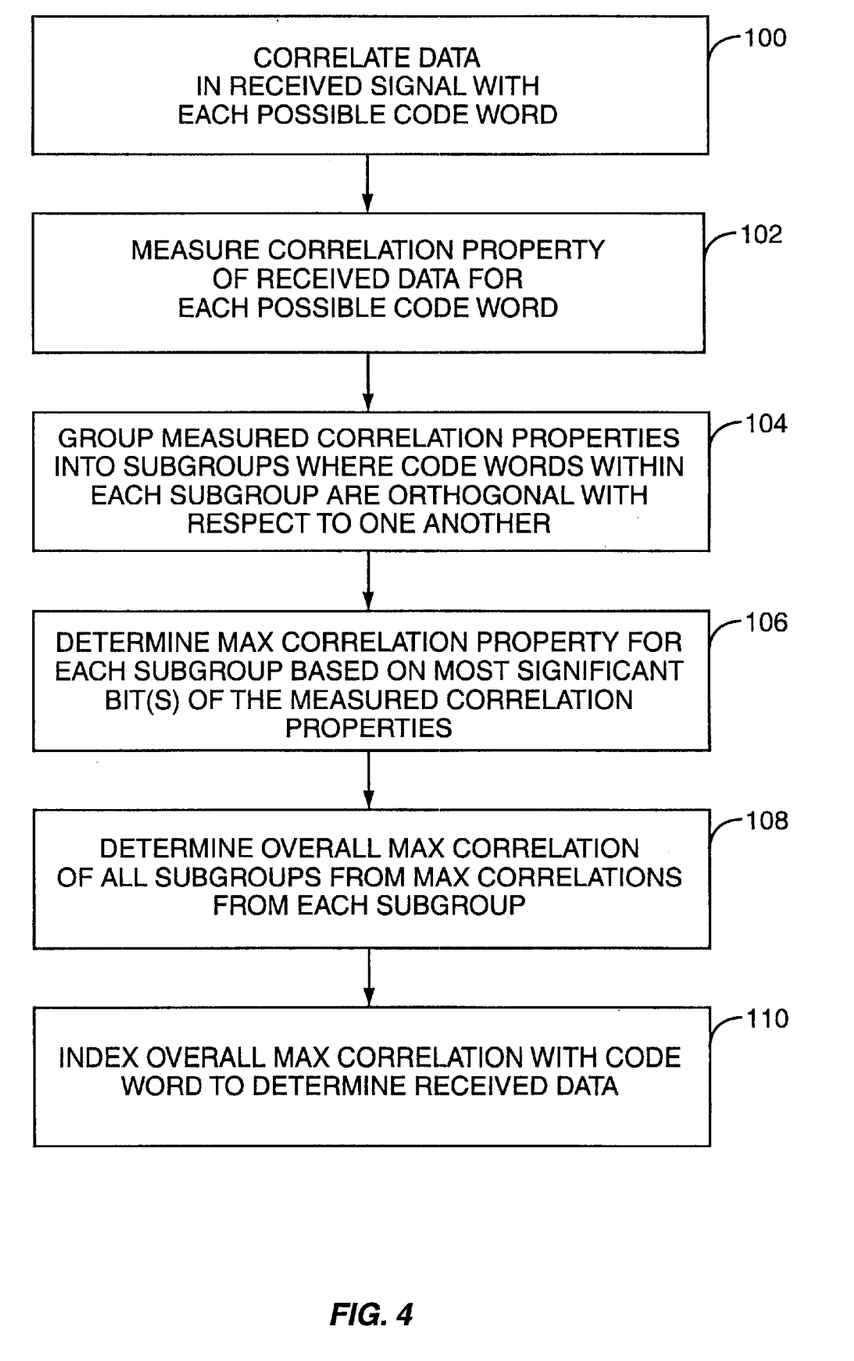
FIG. 4 is a flow chart outlining the basic flow of the present invention.

Importantly, the present invention is configured to determine the cross-correlation having the greatest value without analyzing the entirety of the complex cross-correlation values for each of the code words. In particular, the present invention is capable of monitoring one or more of the most significant bits of the cross-correlation properties. In general and with reference to FIG. 4, received data is correlated with each possible code word in the CCK code set (block 100). The correlation property of the received data for each possible code word is measured (block 102). The steps in block 100 and block 102 are simultaneously performed using FWT. These correlation properties are grouped into subgroups where the code words within each subgroup are orthogonal with respect to one another (block 104). The maximum correlation property for each subgroup is determined based on the most significant bit or bits of the measured correlation properties. The overall maximum correlation property is determined from the outputs of each of the subgroups (block 108). While the maximum correlations for the individual subgroups in the overall correlation is determined, an index is maintained to associate the maximum correlation property with a corresponding code word most likely to be associated with the transmitted data (block 110).

Figure 5A:
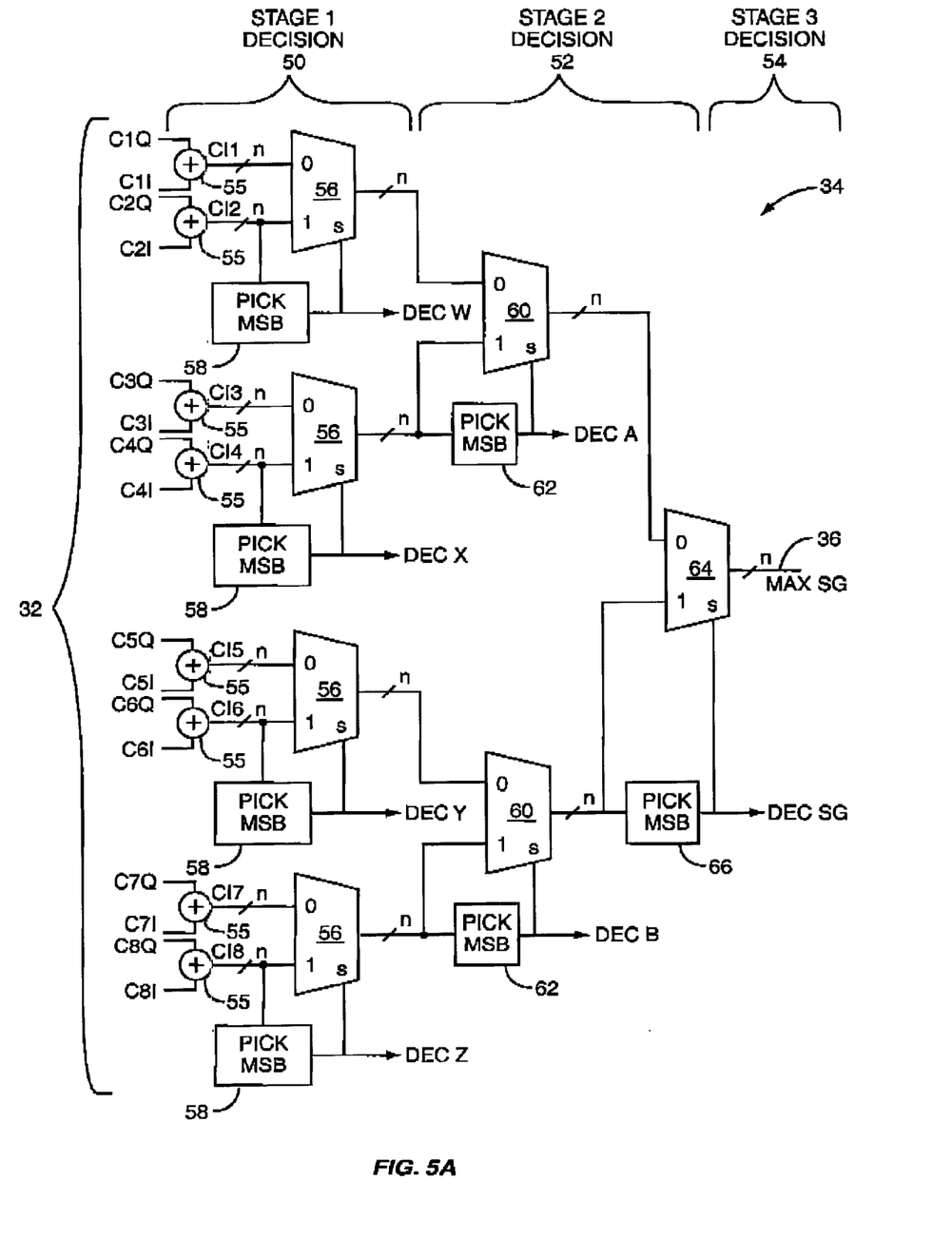
FIG. 5A is a block representation of maximum decision circuitry in a particular subgroup.
Figure 6:
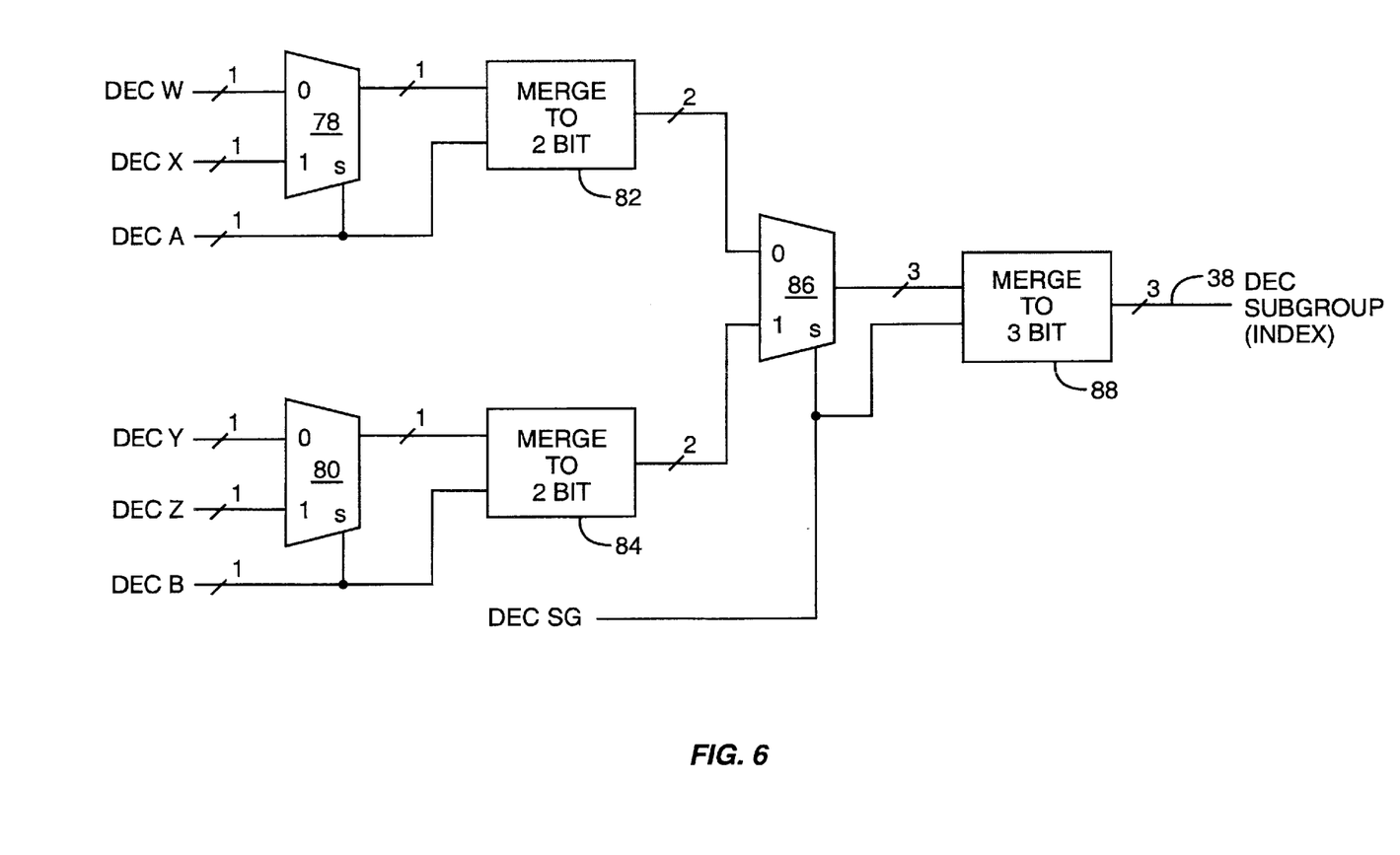
FIG. 6 is a block representation of indexing circuitry capable of keeping track of the correlation corresponding to the maximum correlation value.

The preferred configuration of the subgroup maximum decision circuitry 34 is shown in FIGS. 5A and 6. The circuitry for determining the maximum correlation property value 36 is divided into three stages, Stage 1 (50), Stage 2 (52) and Stage 3 (54). The Stage 1 decision circuitry 50 preferably includes four multiplexers 56. Each multiplexer is capable of receiving two complex cross-correlations 32. The cross-correlations may be passed through circuitry to perform a magnitude function. The functions may include summing the real and imaginary components of the cross-correlation as shown using summing circuitry 55. Alternatively, one may look at the largest of the I or Q coordinates, take the sum of the squares, calculate an exact magnitude using the square root of $I^2+Q^2$, or any number of ways to determine exact or approximate magnitude. As such, the four multiplexers 56 together are capable of receiving each of the eight cross-correlations 32 for the given subgroup. For each of these Stage 1 multiplexers 56, one of the two cross-correlation inputs is fed to MSB detection circuitry 58, which monitors the most significant bit or bits and provides an output to control the multiplexer 56. Based on the value of the most significant bit or bits, the multiplexer 56 will pass one of the two cross-correlations appearing at the two inputs.

Although the MSB detection circuitry 58 can monitor both of the cross-correlation inputs, only one cross-correlation input need be monitored based on the orthogonality of the code words for each subgroup maximum decision circuitry 34. In fact, the largest correlation by far will appear at only one of the 64 cross-correlations. Thus, only one subgroup will see the large correlation, and within that subgroup, only one of the eight inputs to the multiplexers 56 will have a significantly large value. Thus, the MSB detection circuitry 58 can monitor one of the two inputs and make a decision on whether or not the large value is present. In Stage 1, if the large value is present on the line being monitored by the MSB detection circuitry 58, that value will be passed through the multiplexer on to Stage 2. If the cross-correlation being monitored is not the large value, based on the most significant bit or bits, then the other line is passed, whether or not the large value is present. As such, the only guarantee at Stage 1 is that if the most significant bit or bits indicate the large correlation value was detected, that value will be passed. Otherwise, it doesn't matter which low value correlation is propagated through to Stage 2.

Notably, the output of the most significant bit detection circuitry not only controls which input is passed through the multiplexer, but also keeps track of which input was passed. Thus, the output for each of the MSB detection circuitry 58 is monitored. These outputs are DECW, DECX, DECY and DECZ shown in FIG. 6. These outputs are discussed in further detail below.

The Stage 2 decision circuitry 52 is essentially identical to that of half of the Stage 1 decision circuitry, and includes two multiplexers 60, each having corresponding MSB detection circuitry 62. Each of the multiplexers 60 of Stage 2 receives the correlation values passed through from the first stage. Based on the most significant bit or bits of one of the corresponding outputs from Stage 1, the multiplexer and MSB decision circuitry 62 passes the largest value on to the Stage 3 decision circuitry 54. Preferably, only one of the two inputs for the multiplexer 60 is monitored. If the most significant bit or bits indicate the largest correlation value is present, that value will be passed through to Stage 3. Otherwise, one value is passed through, but given the likely low correlation values of all cross-correlations other than the proper correlation, the value passed doesn't really matter. Further, the output of the MSB detection circuitries 62, DECA and DECB, are used to keep track of the correlation having the largest value passed through to Stage 3.

The Stage 3 decision circuitry 54 has two inputs. The first input is the largest correlation value of CI 1 through CI 4, and the second input is the largest correlation value of CI 5 through CI 8. A single multiplexer 64 receives these two inputs. Final MSB detection circuitry 66 monitors one (or both) of these inputs and provides an output to control the multiplexer 64. This output is also used to keep track of which correlation has the maximum value. In essence, the Stage 1 decision circuitry 50 compares CI 1 and CI 2 and propagates the correlation having the largest value to Stage 2. The same comparison and propagation occurs for CI 3 and CI 4; CI 5 and CI 6; and CI 7 and CI 8. Stage 2 compares pairs of the four outputs from Stage 1 to provide the largest correlation value out of CI 1 through CI 4 and that from CI 5 through CI 8. Stage 3 makes a final comparison of the remaining two correlation values to determine a maximum correlation value 36 for the subgroup (Max SG).

Figure 5B:
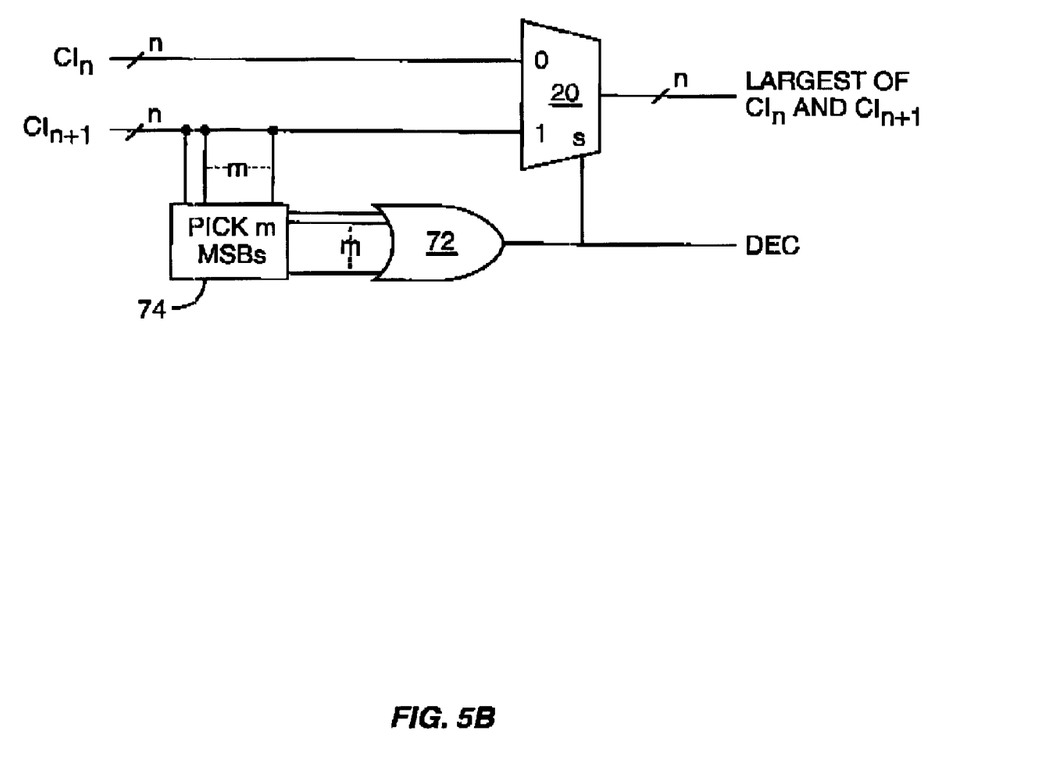
FIG. 5B is a block representation of multiple, most significant bit decision circuitry operable within the Structure of FIG. 5A.

FIG. 5A depicts MSB detection circuitry 58, 62, 66 for each of the three stages capable of monitoring the most significant bit for one of the inputs. As shown in FIG. 5B, the MSB detection circuitry may monitor multiple ones of the most significant bits with multiple MSB detection circuitry 74 and take a logical OR of the monitored bits using logic gate 72 to provide an output controlling a generic multiplexer 70. As such, it may be preferable to monitor multiple ones of the most significant bits to an extent that if any of these more significant bits are set, it is likely the maximum correlation value has been detected.

Referring to FIGS. 5A and 6, the output of the upper two MSB detection circuitry 58 (DECW and DECX) are provided to another multiplexer 78. The multiplexer is controlled by the output of the MSB detection circuitry 62 (DECA) of the upper bracket of the Stage 2 decision circuitry 52. Similarly, multiplexer 80 receives outputs from the MSB detection circuitry 58 (DECY and DECZ) of the lower brackets of the Stage 1 decision circuitry 50. The output of the MSB detection circuitry 62 of the lower bracket of the Stage 2 decision circuitry 54 (DECB) is used to control multiplexer 80, Multiplexer 78 operates to keep track of the correlation, which is propagated through the upper bracket of the Stage 1 and Stage 2 decision circuitry 50, 52. Similarly, multiplexer 80 operates to keep track of the correlation value being propagated through the lower bracket of the Stage 1 and Stage 2 decision circuitry 50, 52.

The circuitry of FIG. 6 is not directly concerned with the maximum correlation values. Rather, the circuitry of FIG. 6 keeps track of indexing of the decision that is associated with the maximum correlation value. In order to accomplish this indexing, DECW and DECX are provided to multiplexer 78, which is controlled by DECA. The outputs of multiplexer 78 and DECA are merged to form a two-bit value at combining circuitry 82. Likewise, DECY and DECZ are fed to multiplexer 80, which is controlled by DECB. The output of multiplexer 80 and DECB are merged to form a 2-bit value by combining circuitry 84. The two 2-bit values from combining circuitry 82 and combining circuitry 84 are each provided to multiplexer 86, which is controlled by DECSG. The output of multiplexer 86 and DECSG are merged to form a 3-bit value at combining circuitry 88. The resulting 3-bit value identifies which of the eight correlations, CI 1 through CI 8 have the maximum correlation value. For example, if CI 4 has the maximum correlation value, the output of the corresponding MSB detection circuitry 58 will set DECX equal one. Given the orthogonality within any subgroup, C 1 through C 4, and C 5 through C 8, will all have their most significant bit or bits equal zero. As such, DECW, DECY and DECZ will all equal zero. Further, the output of the Stage 1 multiplexers 56 will all equal zero, with the exception of the multiplexer 56 comparing CI 3 and CI 4, which will be set to one. As such, the corresponding MSB detection circuitry 62 will set DECA equal one. DECB will be zero, since all the MSBs of the corresponding correlation values will be zero. Thus, the upper bracket in Stage 2 will result in its multiplexer 60 having an output equal one. The lower bracket multiplexer 60 will have an output equal to zero. Thus, the corresponding MSB selector 66 in Stage 3 will be set to zero, thus selecting the output of the upper stage multiplexer 60 from Stage 2 as the maximum correlation value. Thus, the cross-correlation having the greatest value is propagated through Stage 1. Since DECX and DECA were set to one during this progression and DECW, DECY, DECZ, DECB and DECSG were all set to zero, the circuitry shown in FIG. 6 will provide a 3-bit output identifying CI 4 as the correlation having the greatest correlation value. Notably, the 3-bit value can select any one of the eight corresponding inputs.

Figure 7:
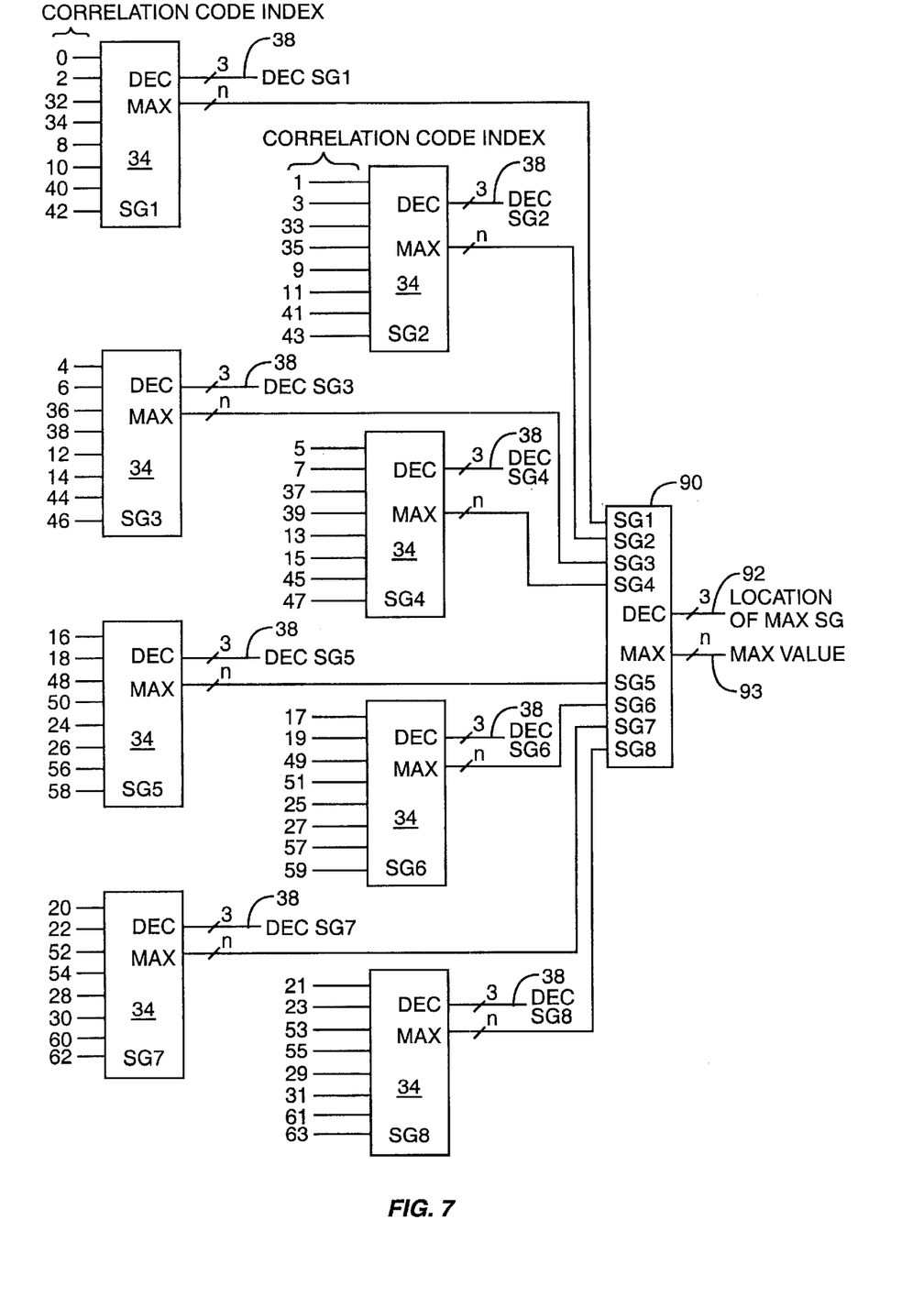
FIG. 7 is a block representation of the overall maximum decision circuitry according to the preferred embodiment.
Figure 8:
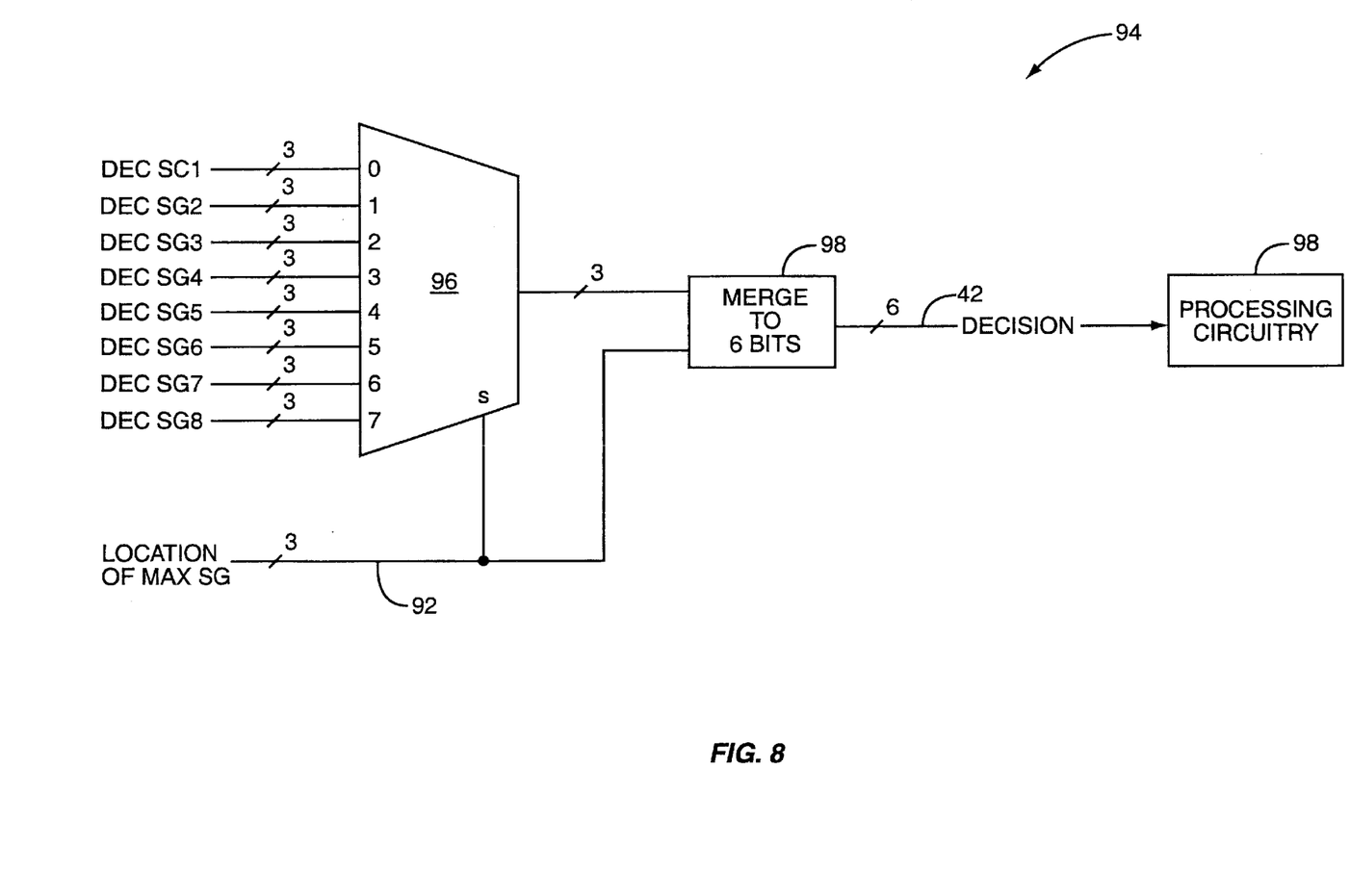
FIG. 8 is a block representation of the overall indexing circuitry according to the preferred embodiment.

Turning now to FIG. 7, each of the eight subgroup, maximum decision circuitries 34 are shown, each having a maximum correlation value 36 and a maximum correlation index 38. Comparitor circuitry 90 monitors each of the subgroup maximum correlation values to determine which subgroup contains the maximum correlation value and to provide the corresponding 3-bit subgroup index 92 and the maximum value itself 93. Referring now to FIG. 8, the maximum correlation index for each of the subgroups 38 (DEC SG1 Through DEC SG8) are provided to indexing multiplexer 96, which is controlled by the subgroup index 92. DEC SG1 through DEC SG8 represent the correlation associated with the maximum value within each subgroup. The subgroup index 92 represents the subgroup having the maximum correlation value. As such, the output of multiplexer 96 is merged with the SG index using combining circuitry 98 to form a 6-bit word wherein three of the bits identify the subgroup having the maximum value and the remaining three bits identify the correlation within that subgroup as associated with the maximum correlation for all of the possible 64 code words. The 6-bit word represents the overall maximum correlation index 42, which may directly or indirectly represent the received data. If the overall maximum correlation index directly represents the words, this value may be simply latched and recognized as the data. Otherwise, processing circuitry 48 may be used to associate the overall maximum correlation index 42 with a table containing corresponding data. As such, the index is essentially a pointer. Furthermore, the index could be run through an algorithm to determine or associate the index with the data.

The most significant bit circuitry is preferably configured to operate on correlation magnitude values. As such, determining the magnitude from complex values may take many forms. For example, one may look at the largest of the I or Q coordinates, take the sum of the squares, calculate an exact magnitude using the square root of $I^2+Q^2$, or any number of ways to determine exact or approximate magnitude. The orthogonality of the code words associated with the subgroups results in significant differences between the proper correlation value and all other cross-correlation values. Even with significant noise, the difference between the maximum correlation value for the proper correlation and all other correlation values within a subgroup are generally at least in order of magnitude. Those of ordinary skill in the art will recognize variations and modifications to carry out the inventive concept disclosed within the above description. All such variations and modifications are considered within the scope of the disclosure and the following claims. Examples of such modifications may include using code sets having more or less than 64 code words. Further, the orthogonal subgroupings may vary, for example, the 64-word code set may be broken down into 16 groups of four orthogonal code words. Further, other reduced complexity decision circuitry may be created that utilizes the orthogonal subgroupings.

We claim:
1. Cross-correlation circuitry for an N word code set wherein the code set has M subgroups of N/M orthogonal code words, said cross-correlation comprising:
 a) correlation circuitry adapted to cross-correlate a received code word with each code word in the code set and provide N cross-correlation values for each cross-correlation;
 b) M decision circuits, each decision circuit adapted to:
  i) receive N/M cross-correlation values corresponding to one subgroup of orthogonal code words;

ii) select the largest cross-correlation value of the subgroup; and iii) associate a cross-correlation corresponding to the largest cross-correlation value of the subgroup; and c) overall maximum decision circuitry adapted to select the overall largest cross-correlation value from the M cross-correlation values selected from said M decision circuits and associate a cross-correlation corresponding to the overall largest cross-correlation value.

2. The cross-correlation circuitry of claim 1 wherein each cross-correlation value is represented by at least one binary word having X bits, the M decision circuits select the largest cross-correlation value by monitoring at least one the most significant bits of select ones of said M cross-correlation values.

3. The cross-correlation circuitry of claim 2 wherein each of said M decision circuits include $\log_2(N/M)$ stages, each said stage adapted to process pairs of cross-correlation values and pass one of each pair of cross-correlation values selected to have the largest cross-correlation value, a first stage receives the N cross-correlation values and a final stage provides the cross-correlation value having the largest value.

4. The cross-correlation circuitry of claim 3 wherein each said stage in said M decision circuits includes a multiplexer for each said pair of cross-correlation values and maximum picking circuitry to monitor the at least one most significant of one of said pair of cross-correlation values and control said multiplexer to select a cross-correlation value of the pair likely to have the largest value.

5. The cross-correlation circuitry of claim 4 wherein said maximum picking circuitry is adapted to select the monitored cross-correlation value of the pair if the monitored cross-correlation value is likely the largest cross-correlation value of the pair and to select an unmonitored cross-correlation value of the pair if the monitored cross-correlation value is likely not the largest cross-correlation value.

6. The cross-correlation circuitry of claim 5 wherein the maximum picking circuitry monitors the most significant bit of one of the pair of cross-correlation values.

7. The cross-correlation circuitry of claim 5 wherein the maximum picking circuitry monitors a plurality of the most significant bits of one of the pair of cross-correlation values.

8. The cross-correlation circuitry of claim 7 wherein the maximum picking circuitry performs a logical OR on the most significant bits.

9. The cross-correlation circuitry of claim 6 wherein the maximum picking circuitry selects the monitored cross-correlation value if the most significant bit is active.

10. The cross-correlation circuitry of claim 7 wherein the maximum picking circuitry selects the monitored cross-correlation value if any one of the most significant bits is active.

11. The cross-correlation circuitry of claim 4 wherein outputs of each said maximum picking circuitry to control corresponding said multiplexers are combined to identify the cross-correlation associated with the largest cross-correlation value for each one of said M decision circuits.

12. The cross-correlation circuitry of claim 1 wherein the overall maximum decision circuitry further comprises a multiplexer having M inputs receiving indicia corresponding to the cross-correlations associated with the M cross-correlation values selected from said M decision circuits and a selection input controlled by an output of said overall maximum decision circuitry corresponding to the decision circuit having the overall largest cross-correlation value to pass the cross-correlation associated with the overall largest cross-correlation value.

13. The cross-correlation circuitry of claim 12 wherein the indicia corresponding to the cross-correlation associated with the overall largest value is combined with the output of said overall maximum decision circuitry corresponding to the decision circuit having the overall largest cross-correlation value to identify the cross-correlation associated with the cross-correlation having the largest value.

14. The cross-correlation circuitry of claim 1 wherein the code set is a complementary code set of N nearly orthogonal code words.

15. The cross-correlation circuitry of claim 14 wherein the cross-correlation circuitry is adapted to perform Fast Walsh Transform to cross-correlate the received code word with each code word in said code set.

16. A method of selecting a cross-correlation value of greatest magnitude for an N length code set having M groups of orthogonal code words, the method comprising:

a) grouping cross-correlation values of a received code word into N/M subgroups of orthogonal code words;

b) selecting a largest cross-correlation values for each subgroup of orthogonal code words based on at least one most significant bit of select cross-correlation values;

c) identifying a cross-correlation associated with the largest cross relation value for each subgroup of orthogonal code words;

d) selecting an overall largest cross-correlation value form the largest cross-correlation values from each subgroup; and e) identifying a cross-correlation associated with the overall largest cross-correlation value.

17. The method of claim 16 wherein the first selecting step includes selecting one of a pair of cross-correlation values based on the at least one most significant bit of one of the pair.

18. The method of claim 17 wherein the first selecting step includes dividing the cross-correlation values within a subgroup into pairs; selecting one of each pair of cross-correlation values based on the at least one most significant bit of one of the pair, grouping selected cross-correlation values into pairs; selecting one of each selected pairs of cross-correlation values based on at least one most significant bit of one of the pair; and repeating the grouping selected cross-correlation values into pairs and selecting one of each selected pairs of cross-correlation values steps until the largest cross-correlation for each subgroup is selected.

19. The method of claim 18 wherein the first identifying step includes associating the correlation corresponding to selected cross-correlation values to identify the cross-correlation selected to have the largest value within each subgroup.

20. The method of claim 19 wherein the second selecting step includes selecting the overall largest cross-correlation value based on at least one most significant bit of the cross-correlation values selected from each subgroup.

21. The method of claim 19 wherein the second identifying step includes combining indicia identifying the cross-correlation selected from the subgroup with the subgroup having the largest correlation value to identify the correlation having the largest overall value.

22. The method of claim 20 wherein the code set is a complementary code set.

23. A system for of selecting a cross-correlation value of greatest magnitude for an N length code set having M groups of orthogonal code words, the system comprising:

a) means for grouping cross-correlation values of a received code word into N/M subgroups of orthogonal code words;
b) means for selecting a largest cross-correlation value for each subgroup of orthogonal code words based on at least one most significant bit of select cross-correlation values;
c) means for identifying a cross-correlation associated with the largest cross-correlation value for each subgroup of orthogonal, code words;
d) means for selecting an overall largest cross-correlation value from the largest cross-correlation values from each subgroup; and
e) means for identifying a cross-correlation associated with the overall largest cross-correlation value.

24. The system of claim 23 wherein the first selecting means is adapted to select one of a pair of cross-correlation values based on the at least one most significant bit of one of the pair.

25. The system of claim 24 wherein the first selecting means is adapted to divide the cross-correlation values within a subgroup into pairs; select one of each pair of cross-correlation values based on the at least one most significant bit of one of the pair, group selected cross-correlation values into pairs; select one of each selected pairs of cross-correlation values based on at least one most significant bit of one of the pair; and repeat the grouping and selecting until the largest cross-correlation for each subgroup is selected.

26. The system of claim 25 wherein the first identifying means is further adapted to associate the correlation corresponding to selected cross-correlation values to identify the cross-correlation selected to have the largest value within each subgroup.

27. The system of claim 26 wherein the second selecting means is adapted to select the overall largest cross-correlation value based on at least one most significant bit of the ross-correlation values selected from each subgroup.

28. The system of claim 26 wherein the second identifying means is adapted to combine indicia identifying the cross-correlation selected from the subgroup with the subgroup having the largest correlation value to identify the correlation having the largest overall value.

29. The system of claim 27 wherein the code set is a complementary code set.

* * * * *